(12) United States Patent
Yamada et al.

(10) Patent No.: US 11,973,903 B2
(45) Date of Patent: Apr. 30, 2024

(54) IMAGE PROCESSING SYSTEM AND IMAGE PROCESSING METHOD WITH DETERMINATION, FOR EACH OF DIVIDED AREAS, AS TO WHICH OF READ IMAGE DATA OR ORIGINAL IMAGE DATA IS USED IN CORRECTING ORIGINAL IMAGE DATA

(71) Applicant: CANON KABUSHIKI KAISHA, Tokyo (JP)

(72) Inventors: Akitoshi Yamada, Kanagawa (JP); Kentaro Yano, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/688,988

(22) Filed: Mar. 8, 2022

(65) Prior Publication Data
US 2022/0303405 A1  Sep. 22, 2022

(30) Foreign Application Priority Data
Mar. 11, 2021 (JP) ................. 2021-039528

(51) Int. Cl.
*H04N 1/00* (2006.01)
(52) U.S. Cl.
CPC ..... *H04N 1/00037* (2013.01); *H04N 1/00005* (2013.01); *H04N 1/00018* (2013.01); *H04N 1/00058* (2013.01); *H04N 1/00084* (2013.01)
(58) Field of Classification Search
CPC ........... H04N 1/00037; H04N 1/00005; H04N 1/00018; H04N 1/00058; H04N 1/00084
See application file for complete search history.

(56) References Cited

U.S. PATENT DOCUMENTS

| 5,883,984 | A | 3/1999 | Huang et al. |
| 6,191,874 | B1 | 2/2001 | Yamada et al. |
| 6,424,752 | B1 | 7/2002 | Katayama et al. |
| 6,549,681 | B1 | 4/2003 | Takiguchi et al. |

(Continued)

FOREIGN PATENT DOCUMENTS

| CA | 2 422 412 A | 4/2002 |
| CA | 2384485 C | 2/2010 |

(Continued)

OTHER PUBLICATIONS

Co-pending U.S. Appl. No. 17/688,993, filed Mar. 8, 2022.
Co-pending U.S. Appl. No. 17/688,938, filed Mar. 8, 2022.

*Primary Examiner* — Nicholas Pachol
(74) *Attorney, Agent, or Firm* — Venable LLP

(57) ABSTRACT

An image processing system comprises: a reading unit configured to optically read a printed material, on which drawing information of an original image is multiplexed, to acquire read image data; an extraction unit configured to extract the drawing information from the read image data acquired by the reading unit; an acquisition unit configured to acquire original image data representing the original image based on the drawing information extracted by the extraction unit; a correction unit configured to compare the read image data with the original image data, and correct the original image data based on a result of the comparison; and a saving unit configured to save, as a result of reading the printed material, the corrected original image data corrected by the correction unit.

13 Claims, 12 Drawing Sheets

(56) References Cited

U.S. PATENT DOCUMENTS

| | | |
|---|---|---|
| 6,608,926 B1 | 8/2003 | Suwa et al. |
| 6,621,921 B1 | 9/2003 | Matsugu et al. |
| 6,694,051 B1 | 2/2004 | Yamazoe et al. |
| 6,704,041 B2 | 3/2004 | Katayama et al. |
| 6,873,436 B1 | 3/2005 | Terada et al. |
| 7,847,958 B2 | 12/2010 | Ishikura |
| 7,924,469 B2 | 4/2011 | Ono et al. |
| 7,944,588 B2 | 5/2011 | Yamada et al. |
| 8,102,558 B2 | 1/2012 | Goto et al. |
| 8,175,155 B2 | 5/2012 | Suwa et al. |
| 8,199,339 B2 | 6/2012 | Ihara |
| 8,203,759 B2 | 6/2012 | Kato |
| 8,237,991 B2 | 8/2012 | Ono et al. |
| 8,295,598 B2 | 10/2012 | Inoue et al. |
| 8,300,925 B2 | 10/2012 | Kunieda |
| 8,339,668 B2 | 12/2012 | Kato |
| 8,405,876 B2 | 3/2013 | Nakatani et al. |
| 9,019,518 B2 * | 4/2015 | Takayama .......... H04N 1/00005 358/1.13 |
| 2002/0191229 A1 * | 12/2002 | Tamamura ............. H04N 1/401 358/461 |
| 2003/0059085 A1 | 3/2003 | Miyake et al. |
| 2003/0063319 A1 | 4/2003 | Umeda et al. |
| 2003/0138143 A1 | 7/2003 | Noguchi |
| 2004/0120544 A1 | 6/2004 | Eguchi et al. |
| 2005/0002589 A1 | 1/2005 | Walmsley et al. |
| 2005/0024394 A1 | 2/2005 | Walmsley et al. |
| 2006/0098231 A1 * | 5/2006 | Konishi ............. H04N 1/00092 358/3.21 |
| 2007/0147657 A1 | 6/2007 | Sato |
| 2008/0062483 A1 | 3/2008 | Morimoto |
| 2008/0218806 A1 | 9/2008 | Yokokura |
| 2009/0086242 A1 | 4/2009 | Kato |
| 2009/0110313 A1 | 4/2009 | Sakaue |
| 2009/0210715 A1 | 8/2009 | Izu et al. |
| 2011/0304861 A1 * | 12/2011 | Monga ................. H04N 1/6033 358/1.9 |
| 2012/0162677 A1 | 6/2012 | Kato |
| 2012/0229867 A1 | 9/2012 | Takagi |
| 2012/0268759 A1 | 10/2012 | Ono et al. |
| 2013/0050764 A1 | 2/2013 | Zhan |
| 2017/0099410 A1 | 4/2017 | Iguchi et al. |
| 2017/0214829 A1 | 7/2017 | Nakabayashi |
| 2019/0005601 A1 | 1/2019 | Ishida et al. |
| 2021/0042487 A1 | 2/2021 | Benito Altamirano et al. |

FOREIGN PATENT DOCUMENTS

| | | |
|---|---|---|
| JP | 2002-142128 A | 5/2002 |
| JP | 2007-043423 A | 2/2007 |
| JP | 2008-186165 A | 8/2008 |
| JP | 4187749 B2 | 11/2008 |
| JP | 5180551 B2 | 4/2013 |
| JP | 2021-027434 A | 2/2021 |

* cited by examiner

FIG. 6A
| 10 | 0 | 0 | -10 | -10 | 0 | 0 | 10 |
|---|---|---|---|---|---|---|---|
| 0 | 0 | -10 | -10 | 0 | 0 | 10 | 10 |
| 0 | -10 | -10 | 0 | 0 | 10 | 10 | 0 |
| -10 | -10 | 0 | 0 | 10 | 10 | 0 | 0 |
| -10 | 0 | 0 | 10 | 10 | 0 | 0 | -10 |
| 0 | 0 | 10 | 10 | 0 | 0 | -10 | -10 |
| 0 | 10 | 10 | 0 | 0 | -10 | -10 | 0 |
| 10 | 10 | 0 | 0 | -10 | -10 | 0 | 0 |
FIG. 6B
| 10 | 0 | 0 | -10 | -10 | 0 | 0 | 10 |
|---|---|---|---|---|---|---|---|
| 10 | 10 | 0 | 0 | -10 | -10 | 0 | 0 |
| 0 | 10 | 10 | 0 | 0 | -10 | -10 | 0 |
| 0 | 0 | 10 | 10 | 0 | 0 | -10 | -10 |
| -10 | 0 | 0 | 10 | 10 | 0 | 0 | -10 |
| -10 | -10 | 0 | 0 | 10 | 10 | 0 | 0 |
| 0 | -10 | -10 | 0 | 0 | 10 | 10 | 0 |
| 0 | 0 | -10 | -10 | 0 | 0 | 10 | 10 |
FIG. 7A
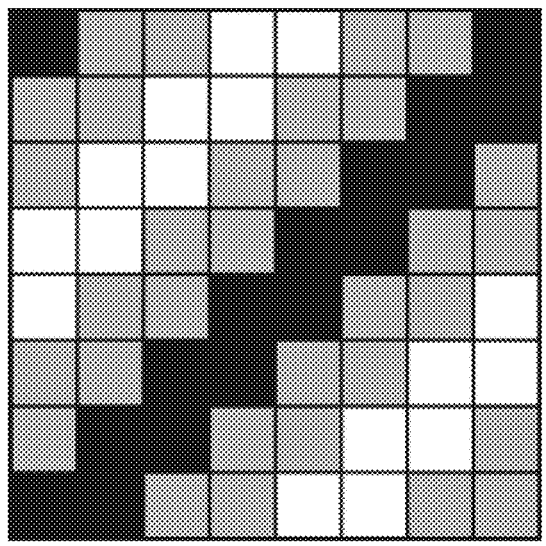
FIG. 7B
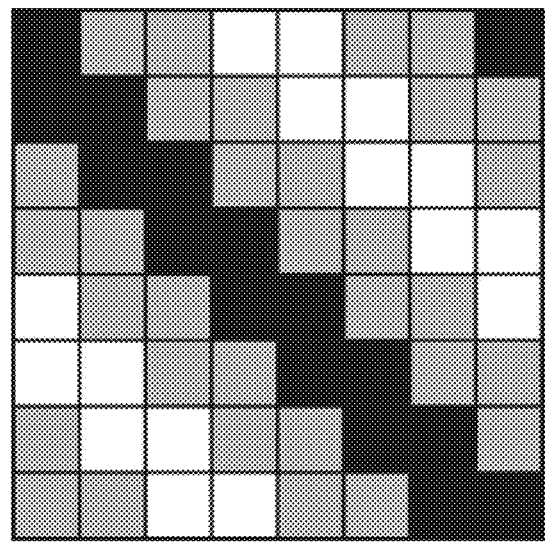

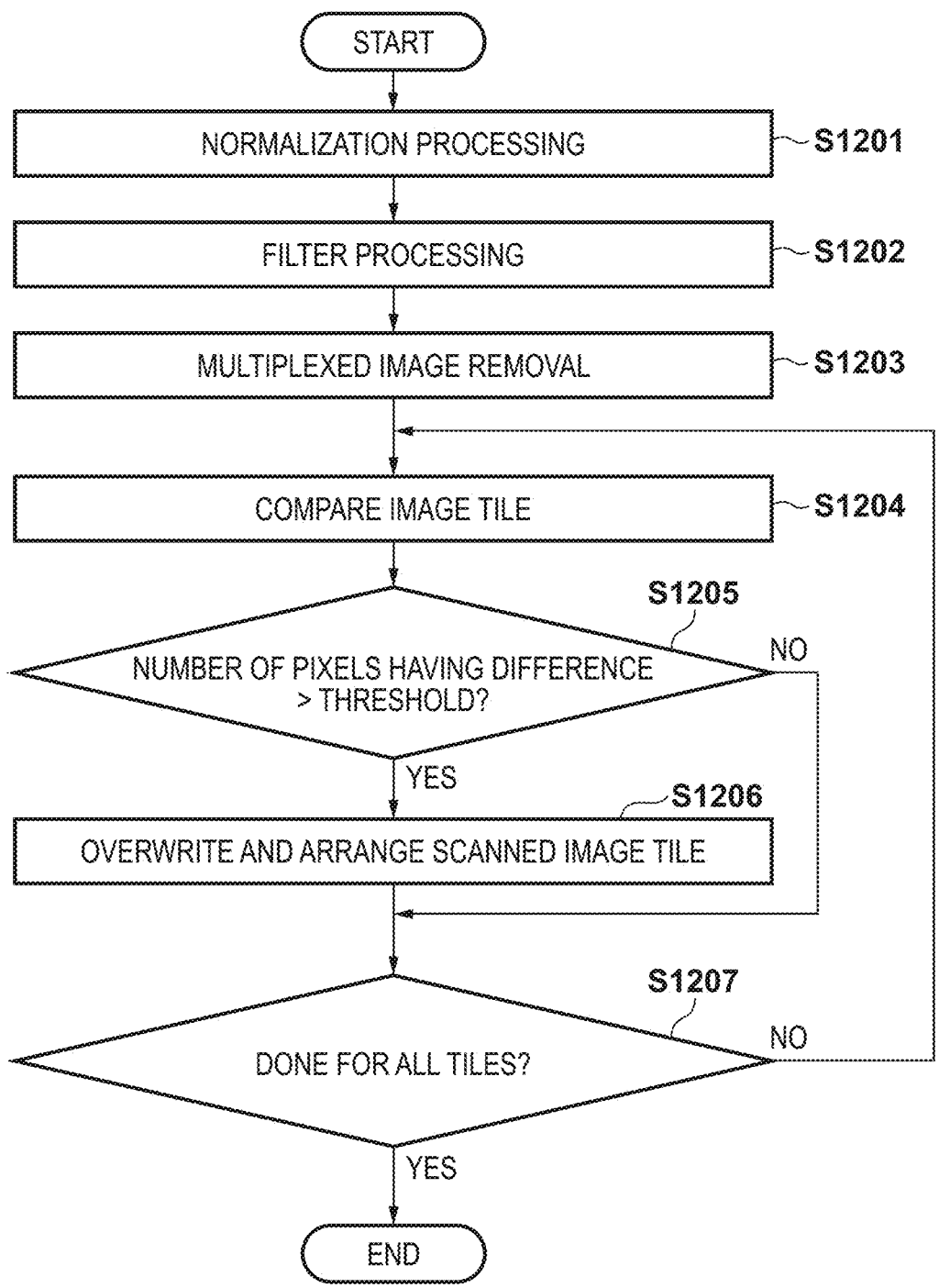

IMAGE PROCESSING SYSTEM AND IMAGE PROCESSING METHOD WITH DETERMINATION, FOR EACH OF DIVIDED AREAS, AS TO WHICH OF READ IMAGE DATA OR ORIGINAL IMAGE DATA IS USED IN CORRECTING ORIGINAL IMAGE DATA

BACKGROUND OF THE INVENTION

Field of the Invention

The present invention relates to an image processing system for processing an image, and an image processing method.

Description of the Related Art

There is known a scan function of reading, by a scanner, an image printed by a printer based on a document image and saving the read image as read data. At this time, the quality of an image represented by the read data generated by performing the printing step and the reading step may be lower than that of the original document image.

Japanese Patent No. 5180551 describes a technique of estimating an output image color in consideration of the output characteristics of a printer in addition to color information in a document image, embedding the estimated color as multiplexed information in a printed image, and extracting the multiplexed information from the image read by a scanner, thereby restoring the image from deteriorated color.

SUMMARY OF THE INVENTION

Improved accuracy is required for restoration from an image which has deteriorated due to a printing step and a reading step.

The present invention provides an image processing system for more accurately performing restoration from an image which has deteriorated due to a printing step and a reading step, and an image processing method.

The present invention in one aspect provides an image processing system comprising: a reading unit configured to optically read a printed material, on which drawing information of an original image is multiplexed, to acquire read image data; an extraction unit configured to extract the drawing information from the read image data acquired by the reading unit; an acquisition unit configured to acquire original image data representing the original image based on the drawing information extracted by the extraction unit; a correction unit configured to compare the read image data with the original image data, and correct the original image data based on a result of the comparison; and a saving unit configured to save, as a result of reading the printed material, the corrected original image data corrected by the correction unit.

According to the present invention, it is possible to more accurately perform restoration from an image which has deteriorated due to a printing step and a reading step.

Further features of the present invention will become apparent from the following description of exemplary embodiments with reference to the attached drawings.

BRIEF DESCRIPTION OF THE DRAWINGS

FIGS. 6A and 6B are views each showing mask data;

FIGS. 7A and 7B are views each showing an image pattern represented by the mask data;

FIG. 12 is a flowchart illustrating corrected PDL data generation processing;

DESCRIPTION OF THE EMBODIMENTS

Figure 1:
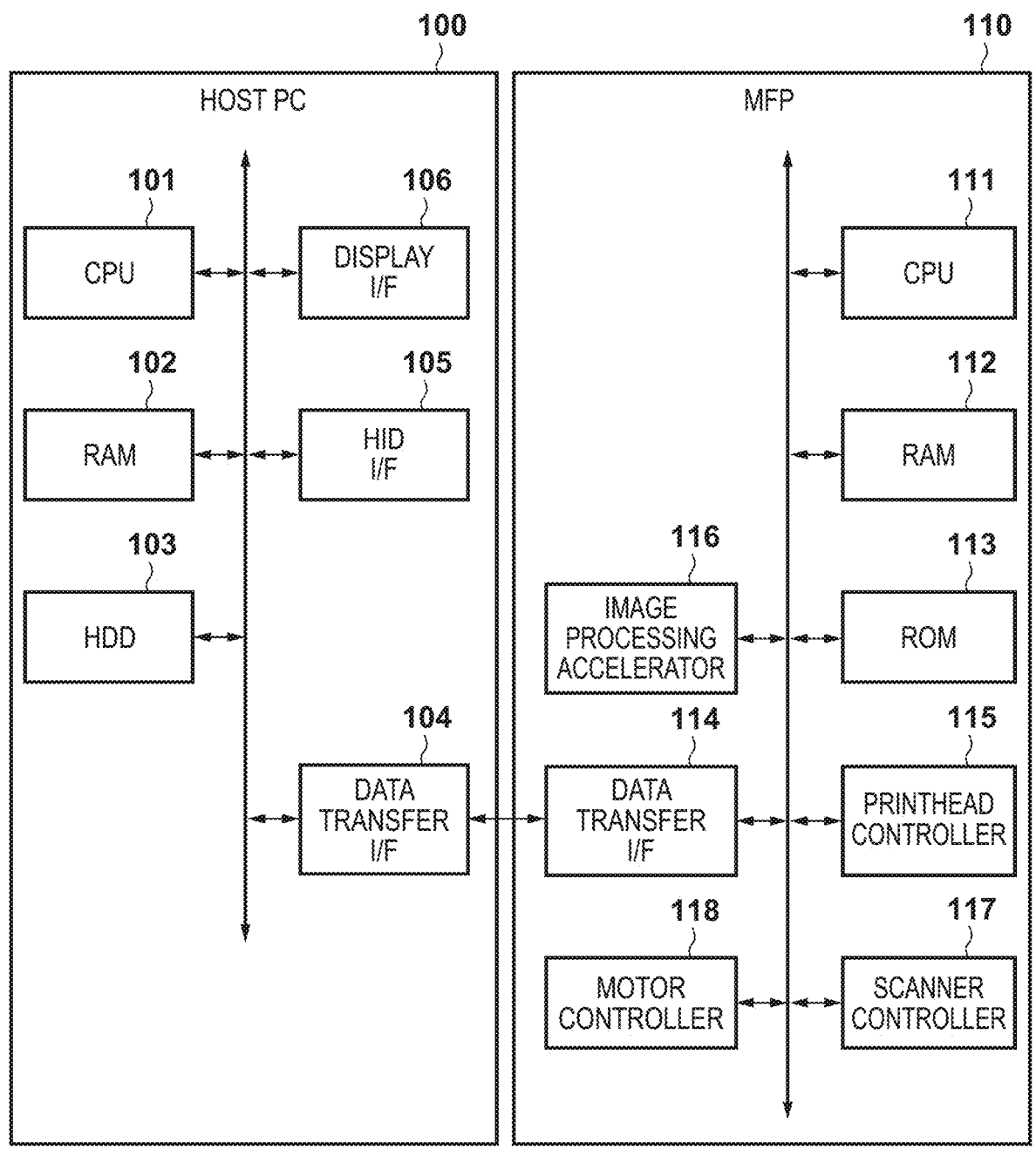
FIG. 1 is a block diagram showing the configuration of a printing system.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

FIG. 1 is a block diagram showing the configuration of a printing system (image processing system) according to this embodiment. As shown in FIG. 1, the printing system includes an MFP (Multi Function Printer) 110 and a personal computer (PC) 100 as a host apparatus. The MFP 110 is a printer integrally having, in the main body, a plurality of functions such as a printer function and a scanner function, and has a copy function implemented by making both the functions cooperate with each other.

The PC 100 includes the following elements. A CPU 101 reads out a program held in an HDD 103 or a RAM 102 and executes it. The RAM 102 is a volatile storage, and temporarily holds a program and data. The HDD 103 is a nonvolatile storage, and holds a program and data to be used in this embodiment. A data transfer interface (I/F) 104 controls data transmission/reception to/from the MFP 110. As a connection method for the data transmission/reception, wired connection such as USB, IEEE1394, or LAN, wireless connection such as Bluetooth® or WiFi, or connection including both wired connection and wireless connection is used. An HID interface (I/F) 105 is an interface for controlling an HID (Human Interface Device) such as a keyboard and a mouse, and accepts an input by a user operation. A display interface (I/F) 106 controls display on a display (not shown).

The MFP 110 includes the following elements. A CPU 111 reads out a program held in a ROM 113 or a RAM 112 and executes it. The RAM 112 is a volatile storage, and temporarily holds a program and data. The ROM 113 is a nonvolatile storage, and holds a program and data to be used in this embodiment.

A data transfer interface (I/F) 114 controls data transmission/reception to/from the PC 100. A printhead controller 115 controls a heating operation of a heater mounted on a printhead (not shown) based on print data converted to be processable by the printhead, thereby discharging ink droplets from a nozzle. For example, the printhead controller 115 is configured to load control parameters and print data from a predetermined address in the RAM 112. Then, when the CPU 111 writes the control parameters and print data at the predetermined address in the RAM 112, the printhead controller 115 is activated to perform the heating operation of the heater mounted on the printhead.

An image processing accelerator 116 is formed by a hardware component, and can execute image processing at a higher speed than the CPU 111. For example, the image processing accelerator 116 is configured to load parameters and data necessary for image processing from a predetermined address in the RAM 112. When the CPU 111 writes the parameters and data at the predetermined address in the RAM 112, the image processing accelerator 116 is activated to perform image processing. Note that in accordance with the specifications of the printer and the like, parameter creation processing and image processing may be executed only in the processing by the CPU 111 instead of the image processing accelerator 116.

A scanner controller 117 causes a scanner unit (not shown) to perform light irradiation on a document placed on a document table. The scanner controller 117 instructs the scanner unit to transmit, to the scanner controller 117, light amount information acquired by an image sensor such as a CCD based on reflected light from the document. For example, when the CPU 111 writes the control parameters and the read data writing address at the predetermined address in the RAM 112, the scanner controller 117 is activated. Then, light emission control of an LED mounted on the scanner unit, acquisition of the light amount information from the scanner unit, and write of the light amount information after the read data writing address in the RAM 112 are performed.

A motor controller 118 controls motor operations of a plurality of motor units (not shown). The motors to be controlled by the motor controller 118 include a motor for relatively moving the printhead with respect to a print medium, and a motor for relatively moving the scanner unit with respect to a platen on which the document is placed. In addition, a motor for maintenance of the printhead is included. The PC 100 and the MFP 110 are not limited to the arrangements shown in FIG. 1, and a block corresponding to a function executable by the PC 100 or the MFP 110 can be included, as appropriate.

In this embodiment, the PC 100 controls the MFP 110 to execute printing in the MFP 110 based on image data to be printed. At this time, multiplexing of drawing information of an image (original image) represented by the image data is performed. As a result, a printed material printed by the MFP 110 is obtained by multiplexing the drawing information of the original image. Note that in this embodiment, PDL data will be described as an example of the drawing information. Then, the printed material is optically read by the scanner unit of the MFP 110, thereby generating read image data. At the time of generating the read image data, the multiplexed drawing information is extracted. In this embodiment, based on a result of comparison of the read image data and the original image data represented by the multiplexed drawing information, the original image data is corrected.

If a printing step and a reading step are performed, an image may deteriorate due to each step. On the other hand, assume a case in which the printed material is read after the user adds handwritten characters or the like to the printed material. In this case, it is impossible to appropriately generate read image data only by restoring the original image based on the multiplexed drawing information. In this embodiment, by correcting the original image data, it is possible to appropriately perform restoration even in the above assumed case while performing restoration from the image which has deteriorated due to each step.

Figure 2:
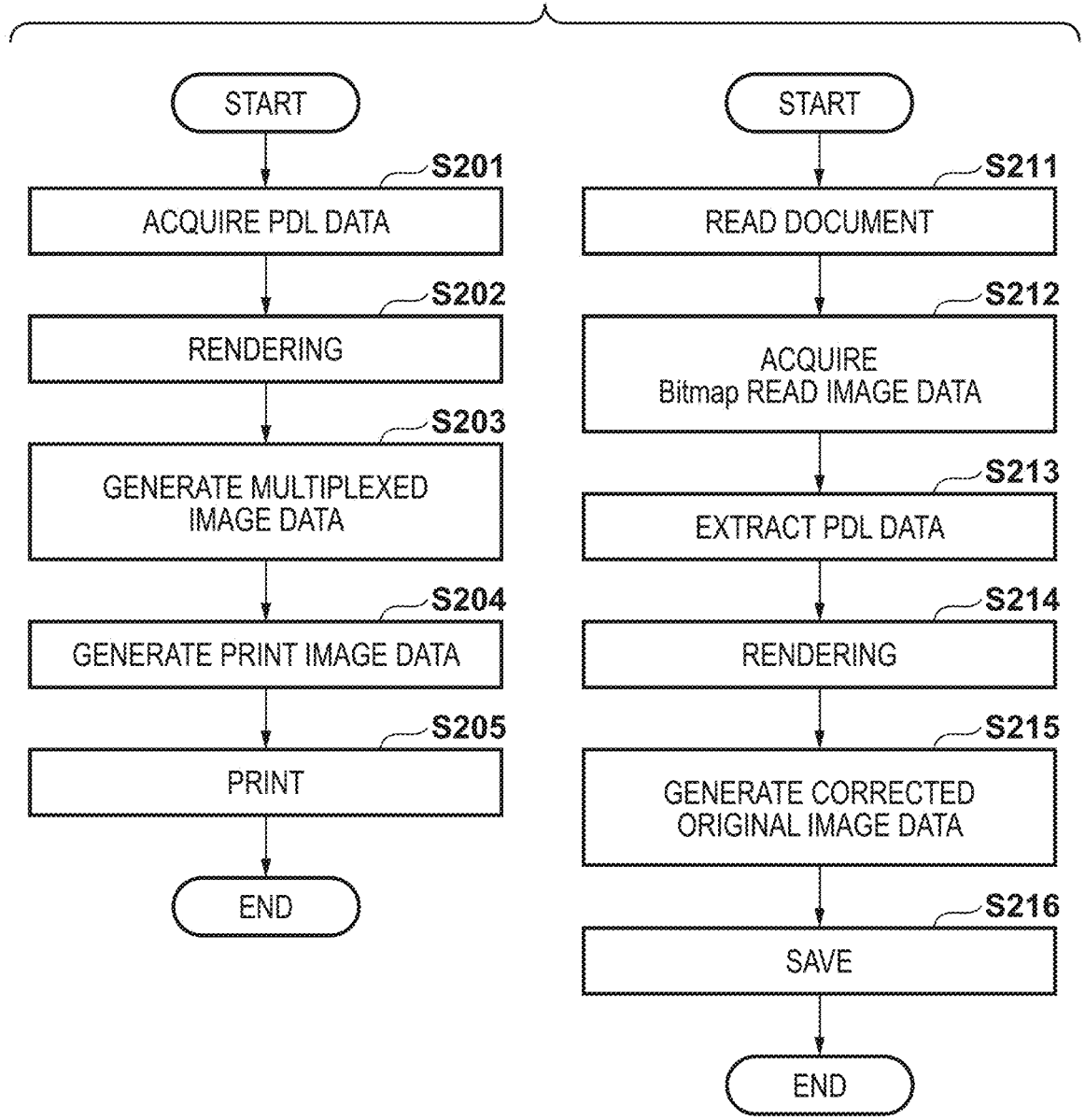
FIG. 2 shows flowcharts of PDL multiplexed printing processing and multiplexed PDL extraction processing.

FIG. 2 shows flowcharts of PDL multiplexed printing processing and multiplexed PDL extraction processing. Steps S201 to S205 of FIG. 2 correspond to the flowchart illustrating the PDL multiplexed printing processing, and processing up to printing by the MFP 110 based on image data to be printed. Steps S211 to S216 correspond to the flowchart illustrating the multiplexed PDL extraction processing, and processing up to reading of the printed material by the scanner unit of the MFP 110 and saving of the read image data.

First, the PDL multiplexed printing processing will be described. In step S201, the CPU 101 of the PC 100 acquires PDL data as image data to be printed. Note that the image data to be printed may be data created by an application in the PC 100 or data acquired from an external apparatus such as a server.

PDL is an abbreviation for Page Description Language, and is formed by a set of drawing commands on a page basis. The types of drawing commands are defined for each PDL specification. For example, the following five types are defined.

Command 1: DOT drawing command (X, Y, color, point size)
Command 2: LINE drawing command (X1, Y1, X2, Y2, color, line type, line width)
Command 3: BOX drawing command (X1, Y1, X2, Y2, color, painting shape)
Command 4: TEXT drawing command (X1, Y1, color, font information, character string information)
Command 5: IMAGE drawing command (X1, Y1, X2, Y2, image file information)

In addition, drawing commands such as a CIRCLE drawing command for drawing a circle may appropriately be used in accordance with the application purpose. As PDL, for example, PDF (Portable Document Format), XPS, HP-GL/2, or the like is used.

Figure 3:
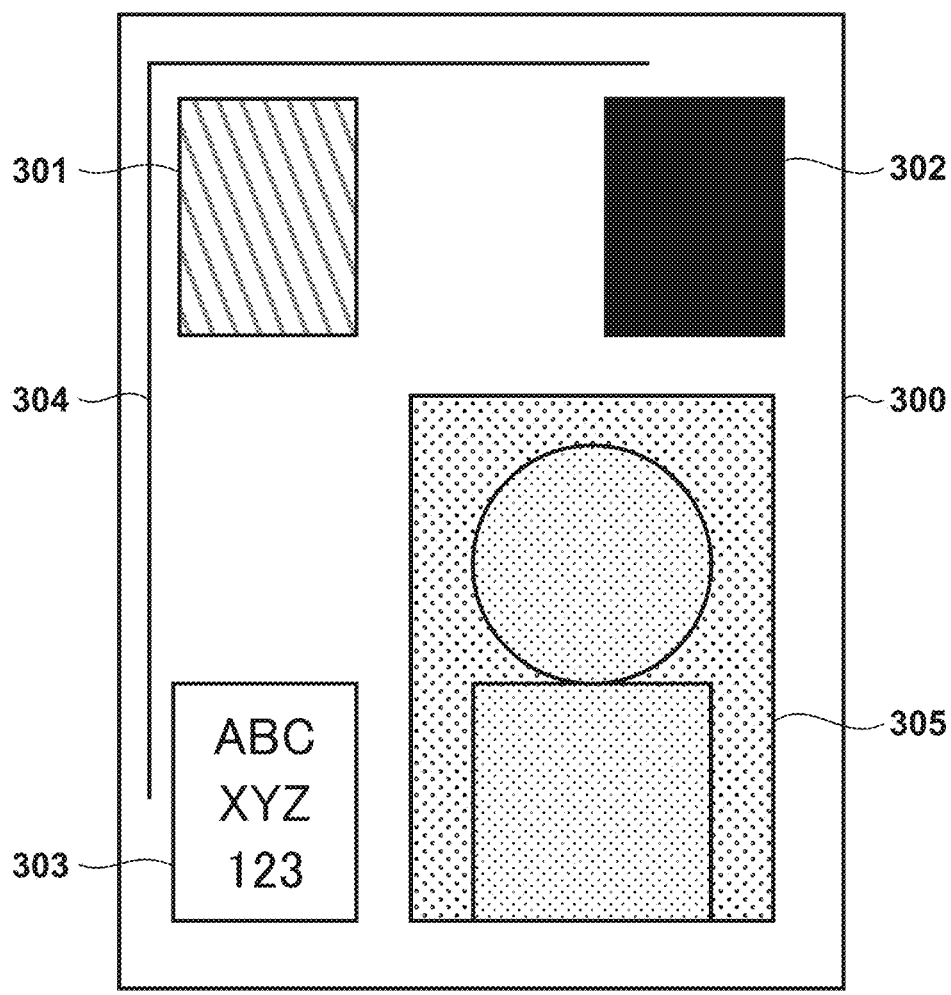
FIG. 3 is a view showing a document image represented by PDL data.

FIG. 3 is a view showing an example of a document image represented by PDL data. A document image 300 shown in FIG. 3 represents one page, and will be described as a document image having, as a pixel count, a width of 600 pixels and a height of 900 pixels.

An example of PDL data corresponding to the document image 300 shown in FIG. 3 will be described below.

<PAGE=001>
<BOX> 50, 75, 200, 300, GRAY, STRIPE </BOX>
<BOX> 420, 75, 550, 300, BLACK, FULL </BOX>
<BOX> 50,620, 200, 825, BLACK, NULL </BOX>
<TEXT> 50,620, 200, 825, BLACK, STD-18, "ABCXYZ123" </TEXT>
<LINE> 25, 25, 25, 700, BLACK, PLAIN, 3 </LINE>
<LINE> 25, 25, 450, 25, BLACK, PLAIN, 3 </LINE>

-continued

```
<IMAGE> 250, 350, 550, 825, "PORTRAIT.jpg" </IMAGE>
</PAGE>
```

<PAGE=001> of the first row is a tag representing a page number. Since PDL is normally designed to be able to describe a plurality of pages, a tag indicating a page break is described in PDL. In this example, a portion up to the </PAGE> tag of the ninth row represents the first page, and corresponds to the document image 300 shown in FIG. 3. If there exists the second page, <PAGE=002> is described following the above PDL data.

A portion from the <BOX> tag to the </BOX> tag in the second row is command 3 described above, and corresponds to an object 301 shown in FIG. 3. The first two coordinates indicate upper left coordinates (X1, Y1) as a drawing start point, and the following two coordinates indicate lower right coordinates (X2, Y2) as a drawing end point. GRAY (gray: R=128, G=128, B=128) is designated as a color, and STRIPE (stripe pattern) as a stripe pattern is designated as a painting shape. In this example, a line in the lower right direction is always set with respect to the direction of the stripe pattern but the angle, cycle, and the like of a line may be designable in the BOX command.

The BOX command of the third row corresponds to an object 302 shown in FIG. 3. For this command, unlike the command of the second row, BLACK (black: R=0, G=0, B=0) is designated as a color, and FULL as filling is designated as a painting shape. The BOX command of the fourth row and the TEXT command of the fifth row correspond to an object 303 shown in FIG. 3. First, a frame around text is described by the BOX command. In this example, NULL (blank) is designated as a painting shape in the BOX.

In the TEXT command of the fifth row, "STD" (standard) is designated as a character font, 18 points are designated as a font size, and "ABCXYZ123" is designated as a character string to be described. The LINE commands of the sixth and seventh rows correspond to an object 304 shown in FIG. 3. A vertical line is drawn by the LINE command of the sixth row. In this example, PLAIN (solid line) is designated as the type of the line to be drawn, and 3 pixels are designated as the thickness of the line to be drawn. Similarly, a horizontal line is drawn by the LINE command of the seventh row.

The IMAGE command of the eighth row corresponds to an object 305 shown in FIG. 3. In this example, "POR-TRAIT.jpg" is designated as the file name of an image existing in the region, which indicates a JPEG file as an image compression format. </PAGE> described on the ninth row indicates the end of drawing of the page.

As PDL data, a format of a PDL file including the "STD" font data and the "PORTRAIT.jpg" image file in addition to the above-described drawing commands may be used. If the font data and the image file are managed separately, it can be assumed that it is impossible to form the character/image portion only by the drawing commands. However, it is possible to prevent such a situation by using the format of the PDL file including the font data and the image file. Such PDL data is acquired in step S201 of FIG. 2.

In step S202, the CPU 101 performs rendering processing of the PDL data acquired in step S201. In the rendering processing, each drawing command described in the PDL data is executed to generate bitmap image data formed by color information for each pixel. The bitmap image data generated in step S202 will also be referred to as rendered image data hereinafter.

As described above, since the document image 300 shown in FIG. 3 is formed with a width of 600 pixels and a height of 900 pixels, the bitmap image data generated in step S202 is formed by 600×900 pixels. Each pixel is represented by 256 tones for R, G, and B components each formed by 8 bits.

In step S203, the CPU 101 generates multiplexed image data. In this example, the PDL data acquired in step S201 is superimposed as multiplexing information on the rendered image data generated in step S202. This is done to make it possible to extract the multiplexed PDL data after the scanner unit reads the printed material.

Processing information by an information processing apparatus such as the PC 100 means processing binary data. Binary data includes pieces of information of "0" and "1", and has a specific meaning by continuously concatenating the pieces of information of "0" and "1". If, for example, information of "hello" is processed as binary data, "h" corresponds to binary data of "01101000" by exemplifying "Shift JIS" as one of character codes. Similarly, "e" corresponds to binary data of "01100101", "l" corresponds to binary data of "01101100" and "o" corresponds to binary data of "01101111". That is, the characters of "hello" can be expressed by binary data of "0110100001100101011011000110110001101111". Conversely, if binary data of "0110100001100101011011000110110001101111" can be acquired, characters of "hello" can be acquired. As described above, multiplexing can be performed by embedding data so as to determine "0" or "1". In this embodiment, to generate "0" and "1", two mask data shown in FIGS. 6A and 6B are used.

FIGS. 6A and 6B each show mask data formed by 8×8 pixels, which can give a pattern having a cycle to a region of 8×8 pixels in image data by adding the values of the mask data to the image data. For example, digital image data is expressed by 8 bits for each color, and assigned with one of values of 0 to 255. Since a value falling outside the range of 0 to 255 cannot be used as image data, if the calculation result of a pixel value is smaller than 0 or equal to or larger than 256, for example, 0 or 255 is assigned to fall within the effective range. In the mask data shown in FIG. 6A or 6B, a change of ±10 is given to the pixel value. However, if, for example, all the values of the image data in the mask region are 255, the values in the region fall within not a range of 245 to 265 but a range of 245 to 255. This embodiment assumes that one color is represented by 8 bits but one color may be represented by another number of bits except for 8 bits. When processing digital image data, the effective range exists regardless of the number of bits for one color, and a change that makes a value fall outside the range is not applied.

FIGS. 7A and 7B are views each visually showing a pattern to be given to the image by the mask data shown in FIG. 6A or 6B. In FIGS. 7A and 7B, a position of "10" in the mask data shown in FIG. 6A or 6B is expressed by black, a position of "0" is expressed by gray, and a position of "−10" is expressed by white. Thus, an oblique line appears in the image to be multiplexed.

An example of a pseudo code for alternately applying the mask data shown in FIGS. 6A and 6B to the overall image will be described below.

```
01:     int i, j, k, l;
02:     int width = 640, height=480;
03:     unsigned char *data = image data;
04:     int **maskA = mask data;
05:     bool isMaskA = true;
06:     for(j = 0; j < height; j+=8){
07:         for(i = 0; i < width; i+=8){
08:             for(k = 0; k < 8; k++){
09:                 for(l = 0; l < 8; l++){
10:                     if(isMaskA == true){
11:                         data[(i+k)+(j+l)*width] += maskA[k][l];
12:                     }
13:                 }
14:             }
15:         }
16:     }
```

Multiplexing of multiplexing information according to this embodiment is implemented by, for example, the above-described pseudo code. Subsequently, in step S204, the CPU 101 generates print image data. To generate print image data, for example, the following method is used.

In step S204, four processes of color conversion, ink color separation, output characteristic conversion, and quantization are performed for each pixel of the multiplexed image data generated in step S203 and formed by R, G, and B pixel values.

Color conversion processing is processing of performing conversion so that RGB information of the multiplexed image data can undergo printing processing by the MFP 110. In general, a color described in a PDL drawing command is set by a color value expressed on a display, and if the value is output intact by the printer, a different color is undesirably output. To cope with this, the color conversion processing is performed.

For example, to calculate a combination of output pixel values (Rout, Gout, and Bout) for a combination of input pixel values (Rin, Gin, and Bin), a three-dimensional lookup table (LUT) is used. If, for example, each of the input values Rin, Gin, and Bin has 256 tones, a table Table1[256][256][256][3] having 16,777,216 (=256×256×256) combinations of output values in total is prepared in advance to calculate the output pixel values, as follows.

$R$out=Table1[$R$in][$G$in][$B$in][0]

$G$out=Table1[$R$in][$G$in][$B$in][1]

$B$out=Table1[$R$in][$G$in][$B$in][2]

Furthermore, the table size may be reduced by decreasing the number of grids of the lookup table from 256 to, for example, 16, and deciding an output value by interpolating the table values of a plurality of grids.

Ink color separation processing is processing of converting the output values Rout, Gout, and Bout of the color conversion processing into output values of the respective ink colors printed by the inkjet printing method. As an example, this embodiment assumes 4 color inks of cyan, magenta, yellow, and black. In this embodiment, similar to the color conversion processing, to calculate a combination of ink color pixel values (C, M, Y, and K) for the combination of the output pixel values (Rout, Gout, and Bout), a three-dimensional lookup table is used. For example, Table2 [256][256][256][4] is prepared in advance to calculate the ink color pixel values, as follows.

$C$=Table2[$R$out][$G$out][$B$out][0]

$M$=Table2[$R$out][$G$out][$B$out][1]

$Y$=Table2[$R$out][$G$out][$B$out][2]

$K$=Table2[$R$out][$G$out][$B$out][3]

Furthermore, the table size may be reduced by decreasing the number of grids of the lookup table from 256 to, for example, 16, and deciding an output value by interpolating the table values of a plurality of grids.

In output characteristic conversion processing, the density of each ink color is converted into a printing dot count rate. For example, the density of 256 tones for each color is converted into a dot count rate Cout, Mout, Yout, or Kout of 1,024 tones for each color. To do this, a one-dimensional lookup table in which a printing dot count rate for the density of each ink color is set is used. For example, Table3[4][256] is prepared in advance to calculate the printing dot count rate, as follows.

$C$out=Table3[0][$C$]

$M$out=Table3[0][$M$]

$Y$out=Table3[0][$Y$]

$K$out=Table3[0][$K$]

Furthermore, the table size may be reduced by decreasing the number of grids of the lookup table from 256 to, for example, 16, and deciding an output value by interpolating the table values of a plurality of grids.

In quantization processing, the printing dot count rate Cout, Mout, Yout, or Kout of each ink color is converted into ON/OFF of an actual printing dot of each pixel. As a quantization method, for example, an error diffusion method or a dither method is used. If the dither method is used, for example, comparison with a threshold corresponding to each pixel position is performed to output ON/OFF of a printing dot of each ink color. For example, the occurrence probability of each printing dot is Cout/1023, Mout/1023, Yout/1023, or Kout/1023.

$C$dot=Halftone[$C$out][$x$][$y$]

$M$dot=Halftone[$M$out][$x$][$y$]

$Y$dot=Halftone[$Y$out][$x$][$y$]

$K$dot=Halftone[$K$out][$x$][$y$]

As described above, the print image data is generated in step S204. In step S205, the CPU 101 transmits the print image data generated in step S204 to the MFP 110 via the data transfer interface 104. The MFP 110 executes printing on a print medium.

As described above, in this embodiment, printing is executed on a print medium based on multiplexed image data obtained by multiplexing PDL data as multiplexing information on rendered image data. In this embodiment, processing of executing printing based on multiplexed image data on which PDL data is multiplexed is called "multiplexing encoding processing". In a printed material printed based on multiplexed image data, for example, the pattern is drawn by an oblique line of 2 pixels, as shown in FIG. 7A or 7B.

Next, the multiplexed PDL extraction processing will be described.

In step S211 of FIG. 2, the CPU 111 of the MFP 110 controls the scanner unit to read a printed material printed based on the multiplexed image data. For example, a user places, as a document to be read, a printed material on the document table of the MFP 110, and instructs scanning. When the CPU 111 controls the scanner unit, the document is irradiated with LED light, and reflected light from the document is converted into an analog electrical signal by an image sensor such as a CCD corresponding to each pixel.

Next, in step S212, the CPU 111 converts the analog electrical signal into digital data to generate bitmap read image data formed by R, G, and B pixel values. In the bitmap read image data generation processing, for example, the following method is used.

In step S212, four processes of MTF (Modulation Transfer Function) correction, input correction, shading correction, and color conversion are performed for each pixel of the acquired bitmap read image data formed by the R, G, and B pixel values.

MTF correction processing is processing of performing correction associated with the resolution of the reading performance of the scanner unit. For example, in reading by the scanner unit, since an image is blurred due to a deviation from a focus position, the limit of the optical characteristic of a lens itself, or the like, restoration is performed to some extent by filter processing or the like. In this example, if strong enhancement processing is performed such that complete restoration is implemented, an adverse effect of the image such as enhancement of highlight detail loss or image noise/contaminated pixel is more conspicuous, and thus restoration is performed to keep the balance between the adverse effect and improvement of image quality. For example, an edge enhancement filter, as shown below, for multiplying pixel values in the central portion of the image by 5 and pixel values in the upper, lower, left, and right portions by −1 is used.

$$R'[x][y]=R[x][y]\times5-R[x-1][y]-R[x+1][y]-R[x][y-1]-R[x][y+1]$$

$$G'[x][y]=G[x][y]\times5-G[x-1][y]-G[x+1][y]-G[x][y-1]-G[x][y+1]$$

$$B'[x][y]=B[x][y]\times5-B[x-1][y]-B[x+1][y]-B[x][y-1]-B[x][y+1]$$

Input correction processing is processing of converting the output value of the CCD, which is originally a photon quantity, into brightness suitable for human visual sensitivity. For example, this is processing of converting an R', G', or B' signal of 4,096 tones for each color into a color intensity value R", G", or B" of 1,024 tones for each color. To do this, a one-dimensional lookup table Table4[3][4096] in which a printing dot count rate for the density of each ink color is set is prepared in advance to calculate the color intensity value, as follows.

$$R''=\text{Table4}[0][R']$$

$$G''=\text{Table4}[1][G']$$

$$B''=\text{Table4}[2][B']$$

Furthermore, the table size may be reduced by decreasing the number of grids of the lookup table from 4,096 to, for example, 256, and deciding an output value by interpolating the table values of a plurality of grids.

Shading correction processing is processing of reducing color/density unevenness caused by a difference in reading sensitivity at each pixel position caused by the manufacturing variation or assembly variation of a lens, LED, or CCD forming the scanner unit. For example, the R", G", or B" signal of 1,024 tones for each color is converted into the color intensity value R‴, G‴, or B‴ of 256 tones for each color. To do this, with respect to the direction (X direction) in which the scanner lens is arranged, a one-dimensional lookup table Table5[X][3][1024] for density conversion for each X-pixel position is prepared in advance to calculate the color intensity value, as follows.

$$R'''=\text{Table5}[x][0][R'']$$

$$G'''=\text{Table5}[x][1][G'']$$

$$B'''=\text{Table5}[x][2][B'']$$

Furthermore, the table size may be reduced by decreasing the number of grids of the lookup table from 1,024 to, for example, 256, and deciding an output value by interpolating the table values of a plurality of grids.

In contrast to printing, the calculated values R‴, G‴, and B‴ are values unique to the scanner unit, and thus color conversion processing is processing of converting the calculated values into values Rout, Gout, and Bout for display on the display. To do this, similar to color conversion at the time of printing, since each of the input values R‴, G‴, and B‴ has 256 tones, a table Table6[256][256][256][3] having 16,777,216 (=256×256×256) combinations of output values in total is prepared in advance to calculate the output values, as follows.

$$R\text{out}=\text{Table1}[R1'''][G1'''][B1'''][0]$$

$$G\text{out}=\text{Table1}[R1'''][G1'''][B1'''][1]$$

$$B\text{out}=\text{Table1}[R1'''][G1'''][B1'''][2]$$

Furthermore, the table size may be reduced by decreasing the number of grids of the lookup table from 256 to, for example, 16, and deciding an output value by interpolating the table values of a plurality of grids.

As described above, the bitmap read image data is generated in step S212.

Figure 4A:
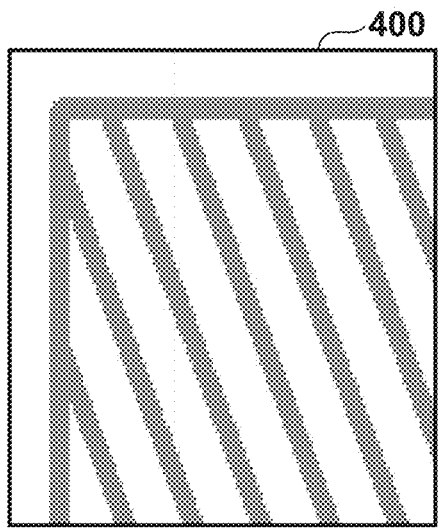
FIGS. 4A and 4B are views for explaining image deterioration caused by printing and reading, respectively.
Figure 4B:
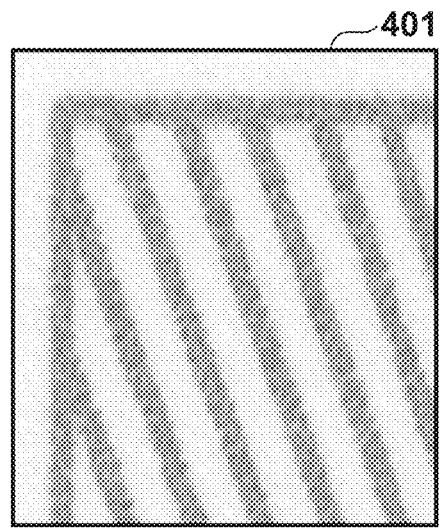

FIGS. 4A and 4B are views for explaining image deterioration caused by printing and reading, respectively. FIG. 4A shows a PDL image 400 obtained by rendering the document image 300 shown in FIG. 3. That is, the PDL image 400 corresponds to the upper left portion of the object 301 in the rendered image data generated in step S202 of FIG. 2. FIG. 4B shows a read image 401 obtained by reading a printed material of the PDL image 400.

As will be apparent by comparing FIGS. 4A and 4B, a straight line in the PDL image 400 has uniform density (R=128, G=128, and B=128) but a straight line in the read image 401 is nonuniform in density, and unevenness is conspicuous in the edge portion of the straight line. Furthermore, there exist pixels having slightly higher density around the straight line, and a background image is a slightly dark image as a whole. This is because in the bitmap read image generated in step S212 by executing printing based on the PDL data and scanning the printed material, image deterioration occurs with respect to the PDL image 400 (original document), as follows.

Deterioration in shape caused by quantization performed in step S204 (a decrease in the number of tones caused by quantization)

Deterioration in shape caused by printing performed in step S205 (print accuracy/print medium (print sheet))

Deterioration in shape caused by scanning of the document performed in step S211 (an image blur caused by the scanner)

Furthermore, deterioration in shape caused by deterioration such as contamination of the print medium is also assumed.

In step S213, the CPU 111 extracts the multiplexed drawing information, that is, the PDL data from the bitmap read image data acquired in step S212. An overview of an example of bitmap image analysis will be described below.

Figure 14:
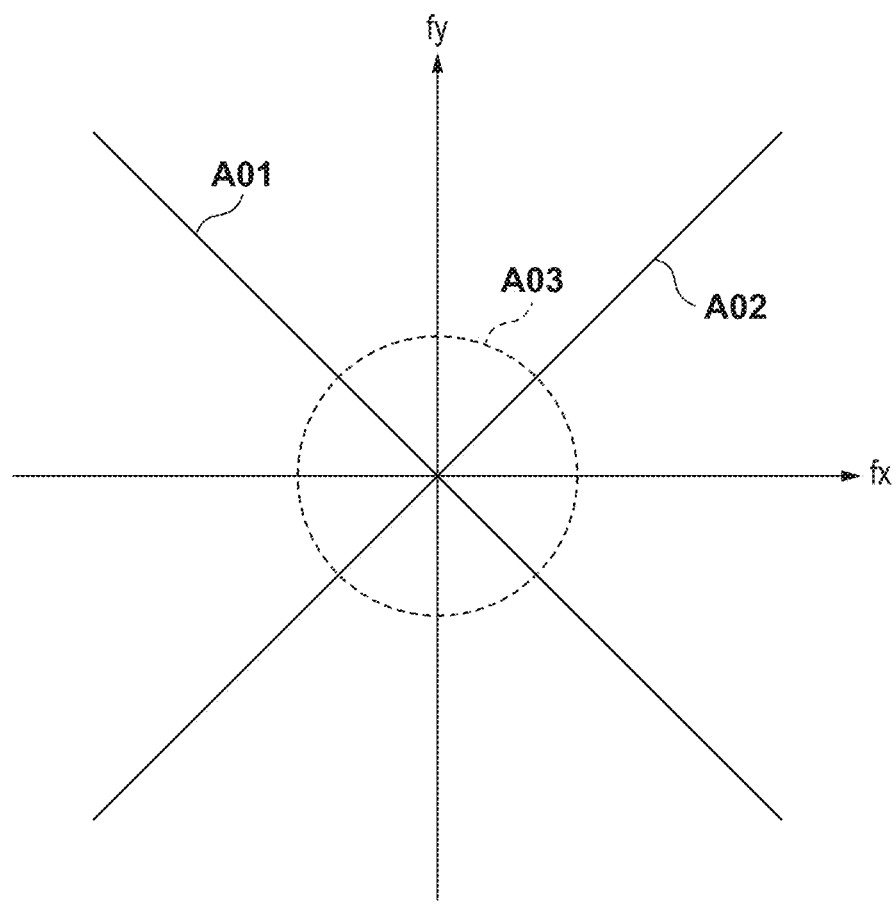
FIG. 14 is a view showing the spatial frequency characteristic of a pattern used for embedding.

First, a position at which the multiplexed information (to also be referred to as additional information hereinafter) is embedded is detected from the image data. More specifically, an embedded position is detected by analyzing the spatial frequency characteristic of the image data. FIG. 14 is a view showing the spatial frequency characteristic of the pattern used for embedding the information. The abscissa represents the frequency in the horizontal direction, the ordinate represents the frequency in the vertical direction, and the frequency rises as it moves apart from the origin.

In this embodiment, as shown in FIGS. 7A and 7B, the two patterns are embedded in the image. In the embedding example, 10 is added or subtracted to or from the B components among R, G, and B components. This causes the pattern shown in FIG. 7A to generate a large power spectrum in a line A01 shown in FIG. 14. Similarly, the pattern shown in FIG. 7B generates a large power spectrum in a line A02. By detecting this power spectrum for, for example, each region of 8×8 pixels, data of "0" or "1" is extracted. Note that by executing edge detection as preprocessing of detection, the power spectrum may be enhanced.

In data extraction by frequency analysis, it is necessary to accurately extract an analysis area from the image data, and thus processing of correcting the deviation of the coordinate position is performed. For example, extraction of a region of 8 pixels×8 pixels from the image and frequency analysis are repeated in the vertical and horizontal directions while shifting by one pixel in each of the vertical and horizontal directions. Then, for example, these processes are repeated 64 times in total until 8 pixels are shifted in each of the horizontal and vertical directions, and a position at which the spectrum is largest is set as a reference position for extraction. In this case, a region to undergo frequency analysis is a region of 16 pixels×16 pixels, and if the region is within a region where the additional information is multiplexed without any gap, it should include at least one piece of additional information. Therefore, it is possible to decide the position of the region as a reference, as described above. After the completion of the position detection processing, the additional information is extracted in accordance with the multiplexing rule with reference to the position, thereby obtaining the embedded sequence of "0" and "1".

Note that if the head of the code region where the additional information is embedded is selected as a position in the image to specify the reference position by the above method, the specified reference position indicates the head of the code region. In other cases as well, since it is possible to roughly specify the position of the region, whose reference position is specified, in the multiplexed code string, it is possible to specify the head of the multiplexed code string with reference to the position. It is possible to specify the head of the region where the additional information is multiplexed, by analyzing the spatial frequencies with respect to the region of 8×8 pixels specified as the head and the preceding and succeeding regions of 8×8 pixels. Thus, since the length of the additional information may be fixed, the entire region where the additional information is multiplexed can be specified. The thus specified entire code region can be decoded into binary data by analyzing the spatial frequencies shown in FIG. 14.

In step S214, the CPU 111 generates rendered original image data by rendering the PDL data extracted in step S213. As the rendering processing, the same processing as that in step S202 is performed. In step S215, the CPU 111 compares/combines the bitmap read image data generated in step S212 with the rendered original image data rendered in step S214, thereby generating corrected original image data.

Figure 5:
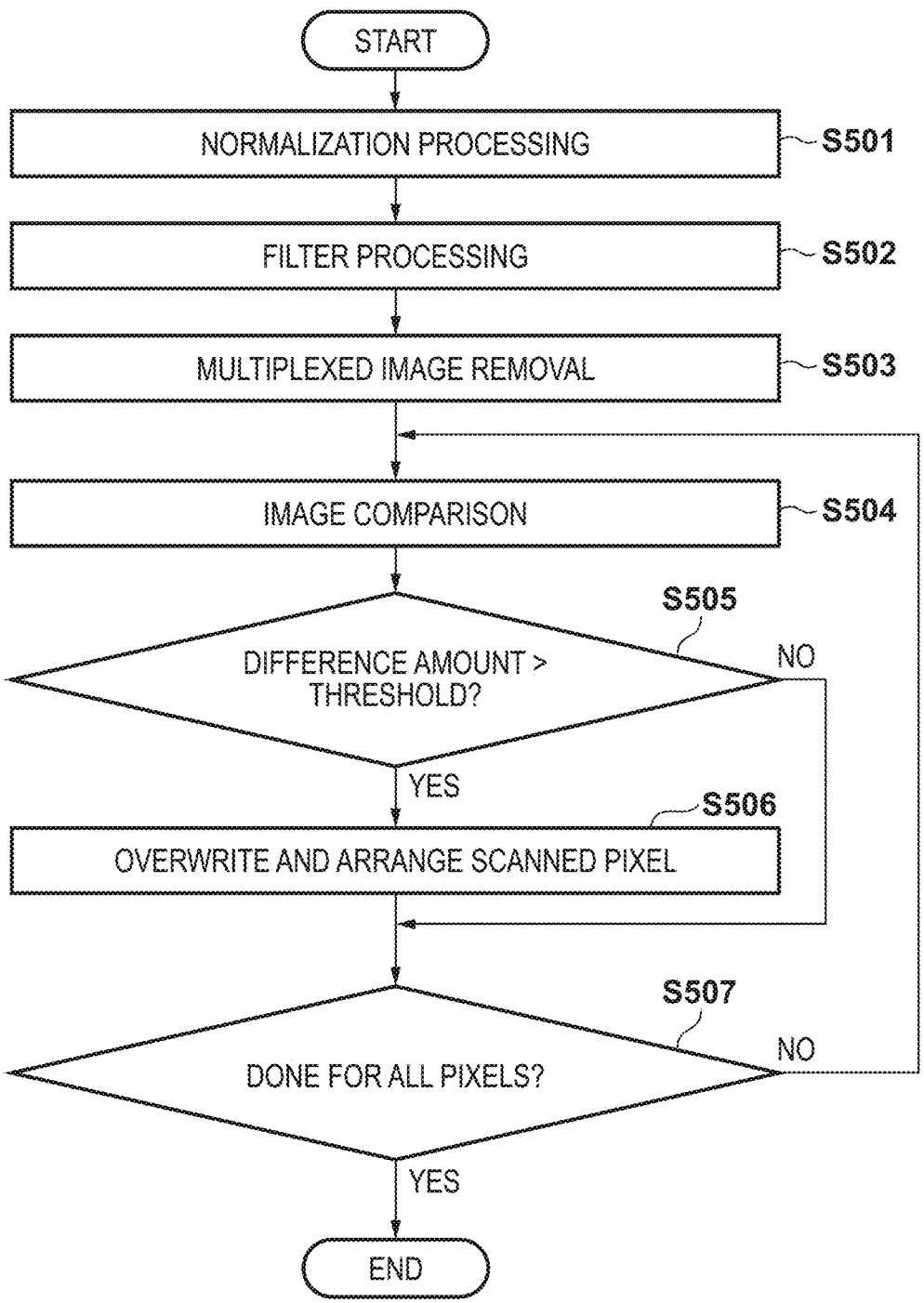
FIG. 5 is a flowchart illustrating corrected PDL data generation processing.

FIG. 5 is a flowchart illustrating the corrected original image data generation processing in step S215. In step S501, the CPU 111 performs normalization processing of the bitmap read image data generated in step S212. This is done because the dynamic range of the bitmap read image data generated in step S212 is different from that of the rendered original image data rendered in step S214.

For example, the brightest portion of the bitmap read image data generally has the color of the sheet of the document to be read, and has a value with some density, in principle. On the other hand, the brightest portion of the rendered original image data includes a pixel of R=255, G=255, and B=255, and thus the brightest colors of those image data are originally different from each other. Similarly, the darkest portion of the bitmap read image data is generally black of ink or toner, and has a value with brightness by some reflected light, in principle. On the other hand, the darkest portion of the rendered original image data includes a pixel of R=0, G=0, and B=0, and thus the darkest colors of those image data are originally different from each other. With respect to the tint of a color document as well, even the brightest red printed on the document to be read has a color saturation lower than that of the brightest red (R=255, G=0, and B=0) on the rendered original image data. In step S501, the bitmap read image data is normalized to match the dynamic range of the bitmap read image data with that of the rendered original image data.

For example, with respect to the pixel values R, G, and B of the bitmap read image data, calculation is performed, as follows. Note that Rd, Gd, and Bd represent the lowest brightnesses of the respective colors, and Rw, Gw, and Bw represent the highest brightnesses of the respective colors.

$$Rnorm=(R-Rd)/(Rw-Rd)\times 255$$

$$Gnorm=(G-Gd)/(Gw-Gd)\times 255$$

$$Bnorm=(B-Bd)/(Bw-Bd)\times 255$$

By performing calculation as described above, the brightest color of the bitmap read image data is normalized to R=255, G=255, and B=255, and the darkest color of the bitmap read image data is normalized to R=0, G=0, and B=0.

In step S502, the CPU 111 performs filter processing for the bitmap read image data normalized in step S501. In step S502, since the above-described MTF correction processing performs edge enhancement within a visually preferable range, filter processing for performing stronger edge enhancement is executed for image comparison.

In step S503, the CPU 111 performs multiplexed image removal processing for the bitmap read image data having undergone the filter processing in step S502. By generating the multiplexed image data in step S203 of FIG. 2, a difference is unwantedly generated between the printed material (document image) and the original image to be originally restored. Thus, the multiplexed image removal processing is performed to remove the difference as much as possible. For example, since the multiplexed drawing information is extracted from the bitmap read image data acquired in step S212, it is possible to make the bitmap read image data acquired in step S212 close to the image data before multiplexing by subtracting the drawing information. In this embodiment, for example, the multiplexed image is removed by further multiplexing values obtained by multiplying, by −1, mask values in which 0 and 1 are embedded, as shown in FIGS. 6A and 6B.

As described above, in this embodiment, the filter processing in step S502 is executed with a correction intensity (edge enhancement) higher than that in step S212 for the bitmap read image data generated by reading the document. As a result, the image restored to some extent by the MTF correction processing is restored more completely, thereby making it possible to perform restoration from the image which has deteriorated due to reading of the document. Furthermore, the multiplexed image removal processing in step S503 is executed for the bitmap read image data generated by reading the document. As a result, it is possible to perform restoration from the image which has deteriorated due to the pattern (multiplexed image, for example, the oblique line of 2 pixels) appearing by multiplexing of the drawing information.

In step S504, the CPU 111 compares the image data with each other. In this embodiment, the CPU 111 compares the rendered original image data rendered in step S214 with the read image data having undergone the multiplexed image removal processing in step S503 on a pixel basis. For example, in step S504, the difference amounts of the respective colors are acquired by the following equations.

$$\Delta R = |R[x][y] \text{ of image } A - R[x][y] \text{ of image } B|$$

$$\Delta G = |G[x][y] \text{ of image } A - G[x][y] \text{ of image } B|$$

$$\Delta B = |B[x][y] \text{ of image } A - B[x][y] \text{ of image } B|$$

In step S505, the CPU 111 determines whether the difference amount of the pixel value exceeds a threshold. In this embodiment, thresholds Rth, Gth, and Bth are provided for respective R, G, and B channels. For example, determination is performed based on the following conditional expression.

```
If ((ΔR > Rth) ||
    (ΔG > Gth) ||
    (ΔB > Bth))  {"Yes"}
    Else  {"No"}
```

This example assumes that the thresholds satisfy, for example, Rth=Gth=Bth=64 but the thresholds may be set in accordance with the characteristics of the scanner unit and the printer unit. If it is determined that the difference amount is larger than the threshold, the process advances to step S507; otherwise, the process advances to step S506.

In step S506, the CPU 111 overwrites the pixel values. The CPU 111 overwrites the pixel values of the rendered original image data with the pixel values of the image data having undergone the multiplexed image removal processing. That is, for the pixel value of each color, the following processing is performed.

$R[x][y]$ of rendered original image data=$R[x][y]$ of image data having undergone multiplexed image removal processing $G[x][y]$ of rendered original image data=$G[x][y]$ of image data having undergone multiplexed image removal processing $B[x][y]$ of rendered original image data=$B[x][y]$ of image data having undergone multiplexed image removal processing For example, to overwrite the pixel values, one plane of overwrite data is additionally prepared. As an image format, RGBα (each color has 8 bits and one pixel has 32 bits) image data including an α value representing the transparency in addition to R, G, and B values is used.

At the start of the processing shown in FIG. 5, the overwrite data has α=255 (highest transparency=no overwrite data) for all the pixels. In step S506, the pixel values are overwritten based on the following equations.

$R[x][y]$ of overwrite data=$R[x][y]$ of image data having undergone multiplexed image removal processing $G[x][y]$ of overwrite data=$G[x][y]$ of image data having undergone multiplexed image removal processing $B[x][y]$ of overwrite data=$B[x][y]$ of image data having undergone multiplexed image removal processing $α[x][y]$ of overwrite data=0(lowest transparency=opaque)

In step S507, the CPU 111 determines whether the determination processing in step S505 has been performed for all the pixels. If it is determined that the determination processing has not been performed for all the pixels, the processing is repeated from step S504 by focusing on another pixel; otherwise, the processing shown in FIG. 5 ends.

As a result of the processing shown in FIG. 5, corrected original image data on which the overwrite data is arranged on the top is generated with respect to the rendered original image data rendered in step S214. In step S216 of FIG. 2, the CPU 111 saves the corrected original image data generated in step S215, and then ends the multiplexed PDL extraction processing. After the multiplexed PDL extraction processing, for example, the CPU 111 causes the printhead controller 115 to perform printing processing based on the corrected original image data.

With the above processing, for example, it is possible to perform restoration from the image which has been obtained by reading the document and has deteriorated, as shown in FIG. 4B, thereby obtaining an image close to the image shown in FIG. 4A. The processing of calculating the difference amount of each pixel value in step S505 and overwriting the pixel value in step S506 will further be described below.

Figure 9A:
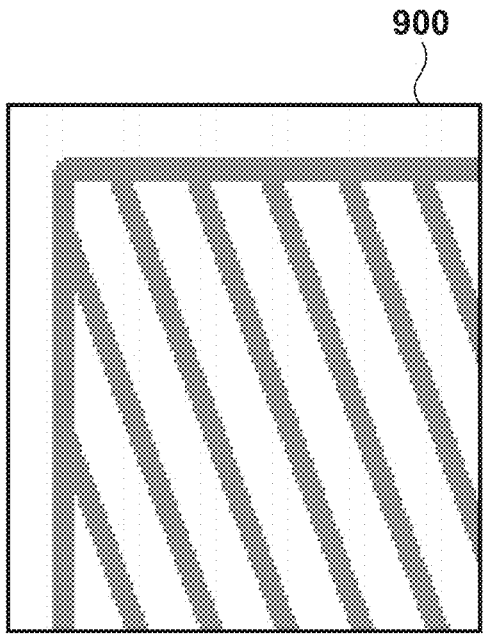
FIGS. 9A to 9C are views for explaining processing for an image added with handwritten characters.
Figure 9B:
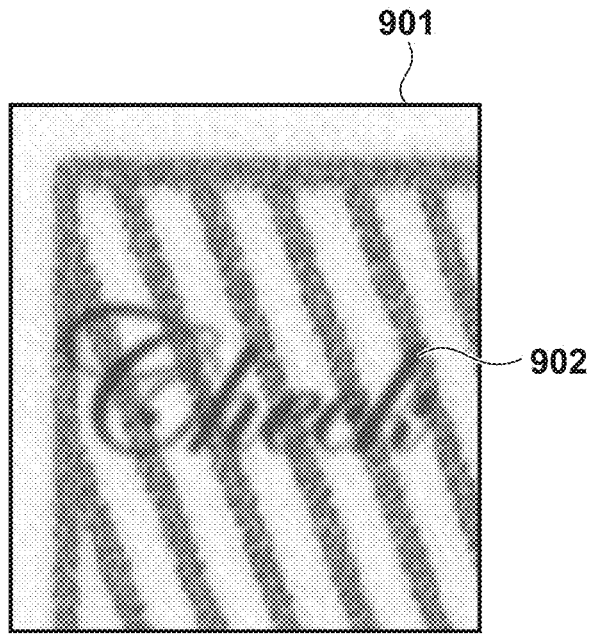
Figure 9C:
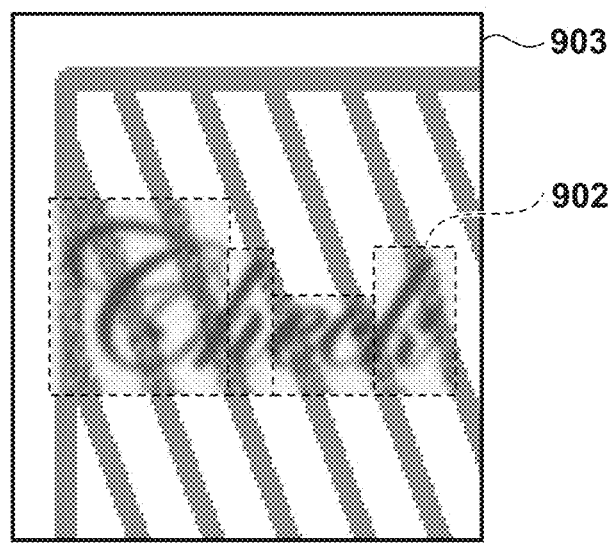

FIGS. 9A to 9C are views for explaining processing for an image added with handwritten characters. A PDL image 900 shown in FIG. 9A is the same as the PDL image 400 shown in FIG. 4A. FIG. 9B shows a read image 901 acquired as a result of reading a document. Unlike FIG. 4B, the read image 901 shows a result of reading the document in a state in which characters 902 of "Check" are added to the printed material of the PDL image 900. Since the characters 902 of "Check" do not exist in the original document, as a matter of course, the characters 902 are not rendered in step S202 of FIG. 2, and are not included in the multiplexed image data generated in step S203. Thus, the characters 902 are not included in the PDL data extracted in step S213, and are not also included in the rendered original image data generated in step S214, either. Therefore, if the rendered original image data generated in step S214 is preferentially used as restored image data, the characters 902 of "Check" of the read image 901 are unwantedly missing.

In this embodiment, with respect to the portion of the characters 902 of "Check", it is determined in steps S504 and S505 that the difference amount of the pixel value is larger than the threshold, and the pixel is considered as a overwrite target pixel in step S506. That is, in this embodiment, as represented by an overwritten and arranged image 903 in FIG. 9C, a pixel of the read image is used for a pixel having a large difference amount, and a pixel of the original image is used for a pixel having a small difference amount. As a result, the portion where no handwritten characters are added can be made close to the original image without missing the portion added with handwritten characters.

As described above, in this embodiment, PDL data is extracted from bitmap read image data obtained by reading a printed material and is combined with the bitmap read image data (handwritten character portion). At this time, by performing the filter processing in step S502 for the bitmap read image data, it is possible to perform further restoration from an image which has deteriorated due to reading of the document. Furthermore, by performing the multiplexed image removal processing in step S503 for the bitmap read image data, it is possible to perform restoration from an image which has deteriorated due to the printing processing of the multiplexed image. In addition, by combining the PDL data (original image) with the bitmap read image data, it is possible to perform restoration from an image which has deteriorated due to contamination of a print medium or the like while preventing missing of handwritten characters added to the printed material or the like.

The example of multiplexing multiplexed information for every 8×8 pixels has been explained with reference to FIGS. 6 and 7. This is an example of multiplexing multiplexed information on a high-frequency region so that it is difficult for the user to visually recognize the multiplexed information. However, in addition to multiplexing of the multiplexed information on the high-frequency region, an arbitrary multiplexing method may be used.

Figure 8A:
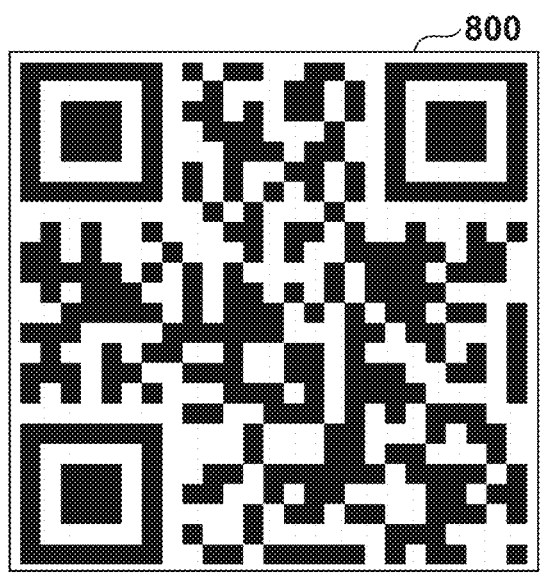
FIGS. 8A and 8B are views for explaining an example of a multiplexing method.
Figure 8B:
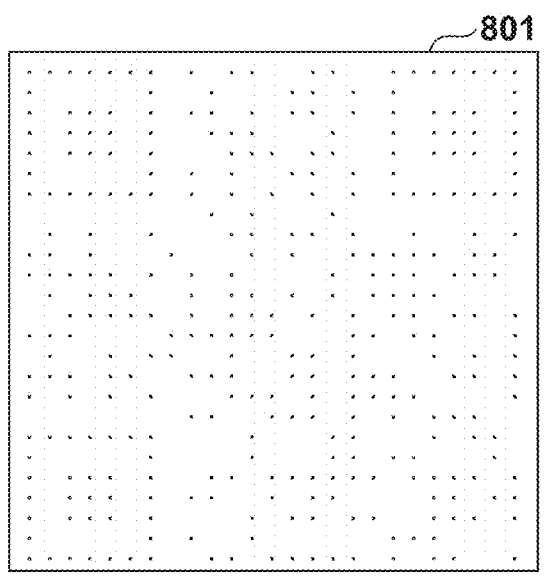

FIGS. 8A and 8B are views for explaining another example of the multiplexing method. FIG. 8A shows an example of a pattern of a QR code. In this example, a QR code is generated from PDL data, and is multiplexed in a form difficult to visually recognize. FIG. 8B shows an actual print pattern, which is a pattern obtained by printing only one dot for every 8×8 pixels. A dot corresponding to a black pixel 800 of FIG. 8A corresponds to one of dots 801 of FIG. 8B. No dot is formed at a position in FIG. 8B corresponding to a blank pixel in FIG. 8A.

This method can form, on a print medium, a multiplexing pattern difficult to visually recognize. For example, in step S203 of FIG. 2, a QR code is generated from the PDL data, as shown in FIG. 8A, and is then superimposed, on the rendered image data, as image data shown in FIG. 8B as separated dots. Since, as ink forming the separated dots, yellow ink is most difficult to visually recognize, the pattern shown in FIG. 8B is formed by yellow ink, thereby making it possible to form, on the print medium, the multiplexing pattern which is more difficult to visually recognize.

In the case of this multiplexing method, in the PDL data extraction processing in step S213, it is determined, for every 8×8 pixels in the bitmap read image data, whether a yellow dot is printed. Then, the QR code pattern corresponding to FIG. 8A is extracted and decoded, thereby extracting the PDL data.

As another multiplexing method, for example, a method of performing threshold modulation at the time of quantization processing in the print image data generation processing in step S204 of FIG. 2, and performing multiplexing may be used. As described above, in accordance with the multiplexing method used, the multiplexed image removal processing in step S503 can be performed by multiplexing a value obtained by multiplying, by −1, the change amount of the pixel value at the time of multiplexing.

In general, if an information amount to be multiplexed increases, it is necessary to increase the printing dot count or a modulation amount. As a result, image deterioration of the overall print image tends to increase. Furthermore, image deterioration also appears in a read image obtained by reading such print image. In this embodiment, in this case as well, the multiplexed image removal processing is performed in step S503, and thus restoration can be possible even for image deterioration caused when the information amount to be multiplexed increases.

As described above, since the document image 300 shown in FIG. 3 is formed with a width of 600 pixels and a height of 900 pixels, one page is formed by 540,000 pixels. When the color of each pixel is represented by 256 tones for R, G, and B components each formed by 8 bits, each pixel has a size of 3 bytes and one page has a size of 1,620,000 bytes 1.6 Mbytes in total. On the other hand, a file size in the PDL format is, for example, 106,200 bytes, as follows, and is about 6.6% of the above size. The breakdown of calculation of the file size is as follows.

Drawing command portion: about 350 characters (≈700 bytes when one character has a size of 2 bytes)

"PORTRAIT.jpg": 427,500 bytes in total when it has a size of 300×475 pixels and each pixel has a size of 3 bytes When a compression ratio is 20%, a size of 85,500 bytes is obtained.

"STD" font data: 20,000 bytes assumed for reasons to be described later It is known as an example that when 20 pages are assumed, the PDL size without font embedding is about 60 KB while the PDL size with font embedding is 460 KB which is a nearly 900% increase (assuming that new characters per page account for 75%). Therefore, a font embedding amount for one page is assumed to be 400 Kbytes/ 20=20 Kbytes.

As described above, as compared with the bitmap image data rendered in step S202, the size of the PDL data acquired in step S201 is as very small as about 6.6%. Therefore, when performing multiplexing, it is possible to significantly reduce image deterioration of the overall print image caused by multiplexing by multiplexing not the bitmap image data but the PDL image data.

Furthermore, by reading a printed material in which PDL data is directly embedded, it is possible to completely restore the PDL data (original document). In this case, since all the drawing commands associated with FIG. 3 can be restored, for example, the read image 401 shown in FIG. 4B can be made identical to the PDL image 400 shown in FIG. 4A. Similarly, characters/thin lines like the objects 303 and 304 in FIG. 3 can also be restored. The copy processing generally cannot avoid image deterioration since the reading processing and printing processing are generally performed. However, if the PDL data of the original document can be extracted at the time of scanning, it is possible to implement an almost complete copy by executing printing based on the extracted PDL data.

Furthermore, if reduction/enlargement is performed at the time of printing, the thin lines/characters are thinned or thickened, and thus the characters/thin lines may be unreadable or disappear. However, according to this embodiment, it is possible to extract the multiplexed PDL data, thereby avoiding the above-described case.

Furthermore, since the characters/thin lines are also reduced/enlarged at the time of making a reduced/enlarged copy, the readability may deteriorate. However, if the multiplexed PDL data can be extracted as in this embodiment, it is possible to change the size with respect to a TEXT drawing command. Therefore, as will be exemplified below, a copy that changes only the size of the character portion may be implemented.

"Reduced copy while maintaining character size" by setting reduction of 50%+character size of 200%

"Enlarged copy while maintaining character size" by setting enlargement of 200%+character size of 50%

"Character enlarged copy" by setting non-magnification+ character size of 200%

"Character reduced copy" by setting non-magnification+ character size of 50%

Similarly, in this embodiment, since the multiplexed PDL data can be extracted, the thickness of a line, the type and color of a line, a painting pattern, and the like may be changed with respect to another command such as a LINE drawing command in copy processing.

In this embodiment, display control may be performed using the corrected original image data saved in step S216. As described above, if the handwritten characters are added to the read document, the corrected original image data obtained by combining the original image represented by the multiplexed PDL data with the image of the handwritten portion is saved. At this time, the image data portion (for example, the characters 902 shown in FIG. 9B) added with the handwritten characters may be saved as separated image data. Then, using the separated image data, display control on the display unit may be performed. For example, the handwritten character portion may be identifiably displayed, for example, displayed in red or flickered. Alternatively, the image (that is, the original image) before the handwritten characters are added may be displayed by erasing the handwritten character portion. The images before and after the handwritten characters are added may be displayed in parallel. In the display in parallel, selection may be acceptable from the user and printing processing may be performed for the selected image.

This embodiment assumes that the PDL multiplexed printing processing shown in FIG. 2 is executed in the PC 100, and the multiplexed PDL extraction processing is executed in the MFP 110. However, the PDL multiplexed printing processing and the multiplexed PDL extraction processing may be executed in one apparatus. For example, both the processes may be executed in the MFP 110.

Second Embodiment

The second embodiment will be described below with respect to the difference from the first embodiment. The first embodiment has explained the arrangement of multiplexing PDL data on rendered image data. In the second embodiment, only part of PDL data is multiplexed on rendered image data.

Assume a case in which it is difficult to extract multiplexed drawing information since information is overwritten, by handwritten characters or stamps, on a document image after printing. Furthermore, assume a case in which it is difficult to perform multiplexing since the size of an image file in a document image or the like is too large, and a case in which multiplexing cannot be performed since image deterioration at the time of multiplexing is large. In this embodiment, only part of PDL data is a multiplexing target, and it is thus possible to avoid the above cases.

Figure 10:
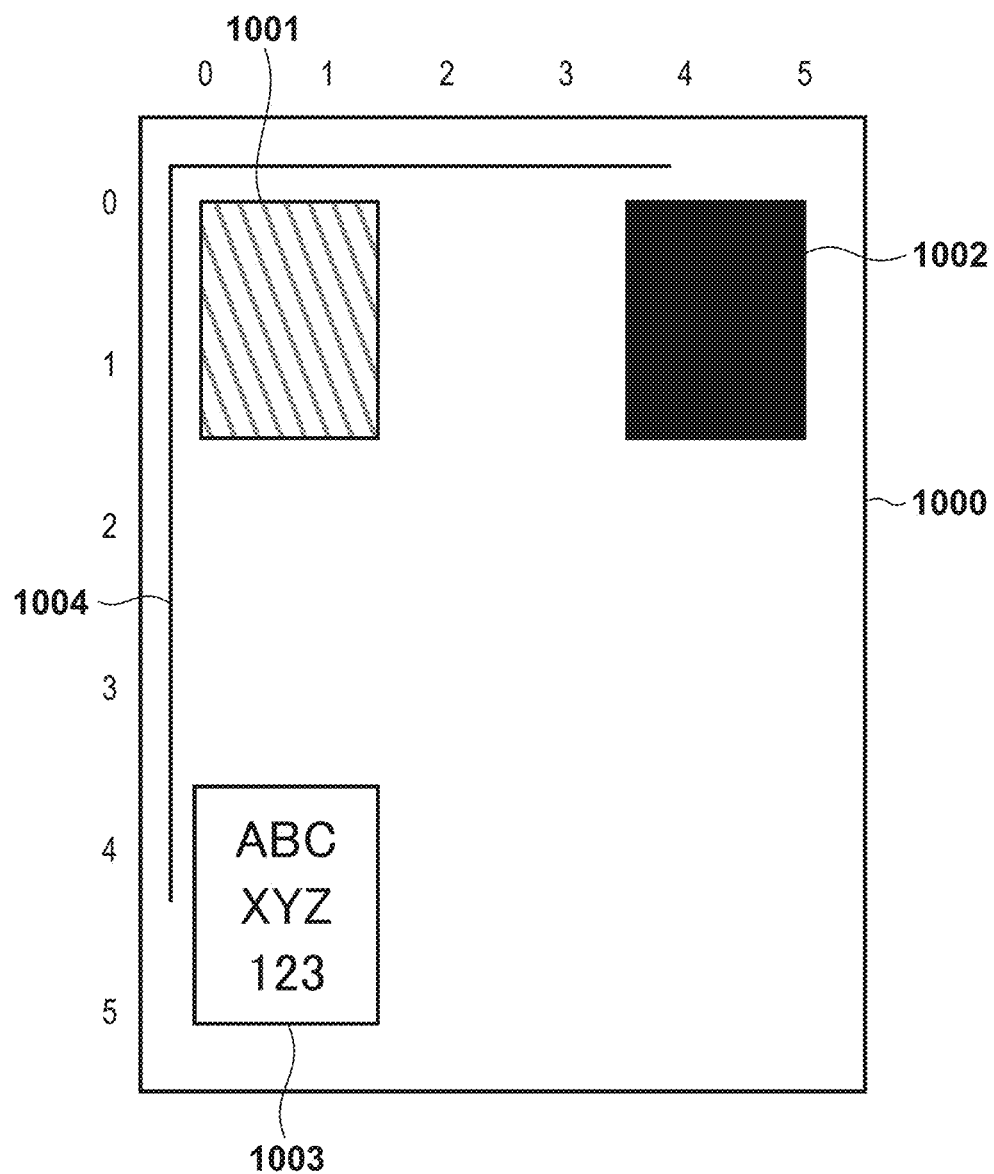
FIG. 10 is a view showing a document image represented by PDL data.

FIG. 10 is a view showing an example of a document image represented by PDL data according to this embodiment. In FIG. 10, a document image 1000 and objects 1001 to 1004 correspond to the document image 300 and the objects 301 to 304 in FIG. 3, respectively. The description contents of multiplexing PDL data according to this embodiment will be described below.

<PAGE=001>
<BOX> 50, 75, 200, 300, GRAY, STRIPE </BOX>
<BOX> 420, 75, 550, 300, BLACK, FULL </BOX>
<BOX> 50,620, 200, 825, BLACK, NULL </BOX>
<TEXT> 50,620, 200, 825, BLACK, STD-18, "ABCXYZ123" </BOX>
<LINE> 25, 25, 25, 700, BLACK, PLAIN, 3 </LINE>
<LINE> 25, 25, 450, 25, BLACK, PLAIN, 3 </LINE>
</PAGE>

In this embodiment, the image drawing command of <IMAGE>250, 350, 550, 825, "PORTRAIT.jpg"</IMAGE> described in the first embodiment is not described. The first embodiment assumes the following contents.

Drawing command portion: about 350 characters (≈700 bytes when one character has a size of 2 bytes)

"PORTRAIT.jpg": 427,500 bytes in total when it has a size of 300×475 pixels and each pixel has a size of 3 bytes When a compression ratio is 20%, a size of 85,500 bytes is obtained.

"STD" font data: 20,000 bytes assumed for reasons to be described later

That is, as will be described below, if the image or font is not embedded, the multiplexing data can be decreased accordingly, and the degree of image deterioration caused by multiplexing can be reduced.

drawing command+image+font: 106,200 bytes (100%)
drawing command+font: 20,700 bytes (19%)
drawing command: 700 bytes (<1%)

Thus, in this embodiment, when generating multiplexed image data in step S203 in the PDL multiplexed printing processing shown in FIG. 2, the above-described multiplexing PDL data is used to generate multiplexed image data. Therefore, PDL data extracted in step S213 is the above-described multiplexing PDL data. Rendered original image data rendered in step S214 is an image including no person image, as shown in FIG. 10.

When generating corrected original image data in step S215, bitmap read image data obtained by reading a printed material on which a person image of an object 305 shown in FIG. 3 is printed is compared with the rendered original image data including no person image. In steps S505 and S506 of FIG. 5, the portion of the person image is processed as the "portion added with handwritten characters" described in the first embodiment. That is, with respect to the rendered original image data rendered in step S214 and including no person image, the portion of the person image of the bitmap read image data is generated as overwrite data. Then, corrected original image data on which the overwrite data is arranged on the top is generated.

As described above, according to this embodiment, it is possible to restore the original image from the read image while reducing the load of multiplexed information.

Third Embodiment

This embodiment will be described below with respect to the difference from the first and second embodiments. Each of the first and second embodiments has explained the arrangement of overwriting overwrite data of the same image size as that of PDL data on rendered image data. If, for example, the document image 300 is formed with a width of 600 pixels and a height of 900 pixels, one page is formed by 540,000 pixels. If the color of each pixel is represented by 256 tones for R, G, B, and a components each formed by 8 bits, each pixel has a size of 4 bytes and one page has a size of 2,160,000 bytes 2.2 Mbytes. In this embodiment, an image region is divided into a plurality of blocks (that is, unit regions), and overwrite data is generated for each block, thereby making it possible to reduce the data amount.

Figure 11:
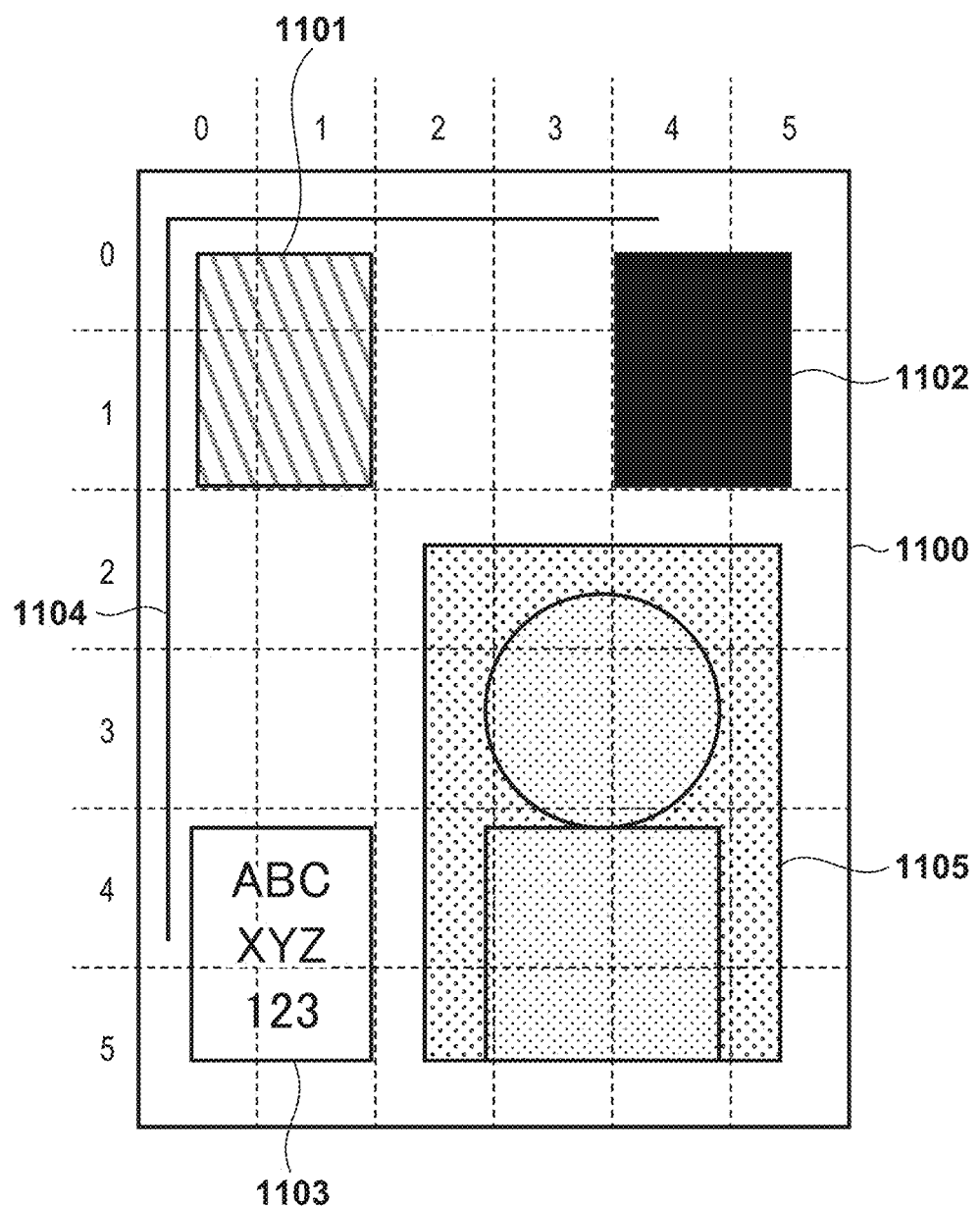
FIG. 11 is a view showing a document image represented by corrected PDL data.

FIG. 11 is a view showing an example of corrected original image data according to this embodiment. A corrected PDL image 1100 and objects 1101 to 1105 in FIG. 11 correspond to the document image 300 and the objects 301 to 305 in FIG. 3, respectively. On the corrected PDL image 1100 shown in FIG. 11, broken lines that divide the region into five portions in each of the horizontal and vertical directions are shown. In this embodiment, the entire PDL image is divided into 25 portions, and overwrite data corresponding to a necessary portion is overwritten on rendered image data.

FIG. 12 is a flowchart illustrating corrected original image data generation processing according to this embodiment. Steps S1201 to S1203 of FIG. 12 are the same as steps S501 to S503 of FIG. 5, respectively, and a description thereof will be omitted.

In step S1204, a CPU 111 compares image tiles. An image tile indicates each image tile (a width of 120 pixels and a height of 180 pixels) obtained by dividing the entire image (a width of 600 pixels and a height of 900 pixels) into, in this example, five portions in each of the vertical and horizontal directions. The CPU 111 compares, for each image tile, rendered image data with image data having undergone multiplexed information removal processing. The CPU 111 counts the number of pixels having differences as a result of comparison for each image tile.

In step S1205, the CPU 111 determines, for the image tile, whether the number of pixels having differences exceeds a predetermined threshold. In other words, it is determined in step S1205 whether a "portion added with handwritten characters and the like" exists in the image tile. As the predetermined threshold, the number of pixels or a ratio may be used. For example, 216 pixels as about 1% are used as the threshold. The threshold may be set by an arbitrary standard. For example, as the threshold, 216 pixels as 1% are set as, for example, the number of pixels that can be ignored by a foreign substance on a sheet or scanner glass. If it is determined in step S1205 that the threshold is exceeded, the process advances to step S1206; otherwise, no overwrite data is generated for the image tile and the processing is repeated from step S1204 by focusing on the next image tile.

In step S1206, the CPU 111 arranges, on the rendered image data, the image data of the image tile of the image data having undergone the multiplexed information removal processing. In this case, if the image tile is overwritten and arranged, image data in which each pixel is formed by R, G, and B components each formed by 8 bits and thus has a size of 3 bytes is used as the image data, and thus the image data amount of each tile is 64,800 bytes. That is, as compared with a case in which it is decided whether to overwrite and arrange each pixel by determining the difference between the pixel values according to the first embodiment, it is possible to further reduce the data amount. As the number of pixels of each image tile decreases, the image data amount of each image tile decreases. Therefore, the possibility that unnecessary data is included is reduced with respect to a portion except for a portion which needs to be overwritten. To reduce the image data amount, the image data may be compressed.

Figure 13A:
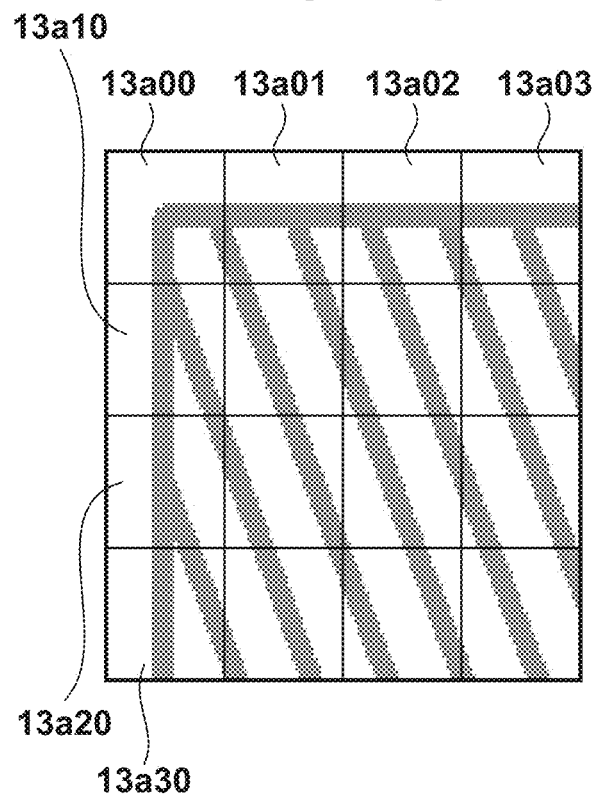
FIGS. 13A to 13C are views for explaining processing for an image added with handwritten characters.
Figure 13B:
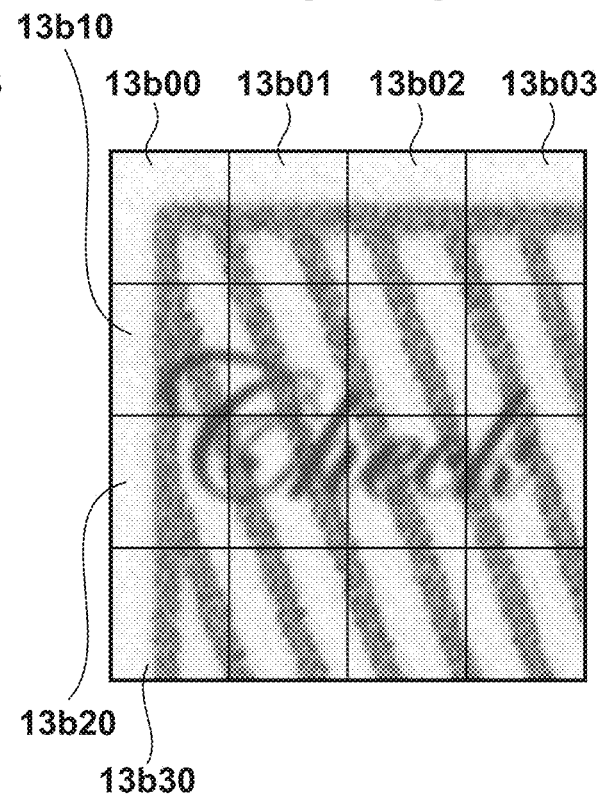
Figure 13C:
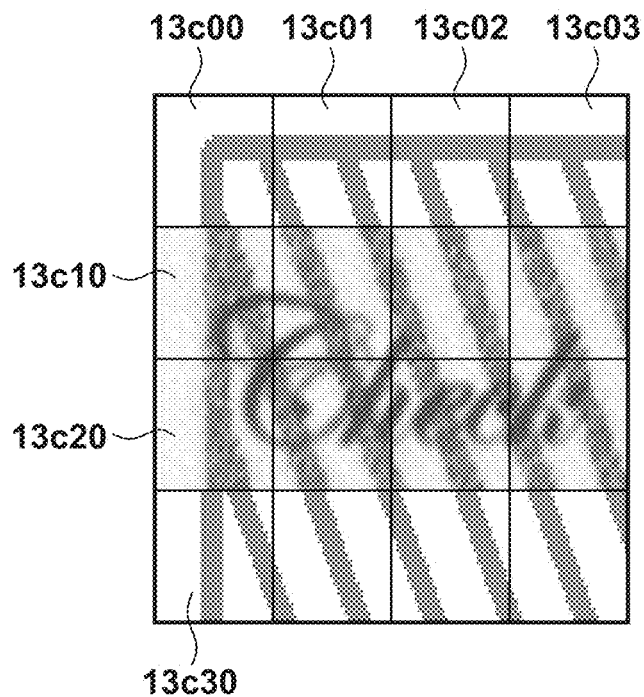

FIGS. 13A to 13C are views for explaining processing for an image added with handwritten characters according to this embodiment. FIG. 13A shows an image represented by the rendered image data. FIG. 13B shows an image represented by read image data obtained by reading a document. In each of FIGS. 13A and 13B, each image is divided into 4×4 image tiles, and the CPU 111 manages them by adding identification information of 13*a*00 to 13*a*33 or 13*b*00 to 13*b*33. As the identification information, for example, in an image tile 13-*a*-*x*-*y*, the rule is defined so that x represents the tile position number in the horizontal direction and y represents the tile position number in the vertical direction. The same applies to tiles 13-*b*-*x*-*y* and 13-*c*-*x*-*y*.

FIG. 13C shows a result of performing, in steps S1205 and S1206, overwrite processing of eight image tiles 13*a*11, 13*a*12, 13*a*13, 13*a*14, 13*a*21, 13*a*22, 13*a*23, and 13*a*24 where there exists a character string "Check" as added handwritten characters. As shown in FIG. 13C, the read image data is overwritten with respect to only the above eight image tiles.

As describe above, according to this embodiment, data of only a region which needs to be overwritten is overwritten on the rendered image data. This arrangement can reduce the size of the corrected original image data.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-039528, filed Mar. 11, 2021, which is hereby incorporated by reference herein in its entirety.

What is claimed is:

1. An image processing system comprising:
   (a) one or more circuits, or (b) one or more processors and at least one memory, the at least one memory being coupled to the one or more processors and having stored therein instructions executable by the one or more processors,
   wherein at least one of (a) the one or more circuits or (b) the execution of the instructions causes the image processing apparatus to function as a plurality of units comprising:
   (1) a reading unit configured to optically read a printed material, on which drawing information of an original image is multiplexed, to acquire read image data;
   (2) an extraction unit configured to extract the drawing information from the read image data acquired by the reading unit;
   (3) an acquisition unit configured to acquire original image data representing the original image based on the drawing information extracted by the extraction unit;
   (4) a correction unit configured to (a) divide each of the read image data and the original image data into plural image areas, (b) compare the read image data with the original image data for each of the plural image areas, (c) determine, for each of the plural image areas, which of the read image data or the original image data is used in correcting the original image data, and (d) correct the original image data based on a result of the determination;
   (5) a saving unit configured to save, as a result of reading the printed material, the corrected original image data corrected by the correction unit;
   (6) a multiplexing unit configured to multiplex the drawing information on the image data of the original image to generate multiplexed image data; and
   (7) a generation unit configured to generate, based on the multiplexed image data generated by the multiplexing unit, print image data for printing the printed material.

2. The system according to claim 1, wherein the correction unit compares a pixel value of the read image data with a pixel value of the original image data, and corrects the original image data based on a result of the determination.

3. The system according to claim 2, wherein, in an image area of the plural image areas, if a difference between the pixel value of the read image data and the pixel value of the original image data is larger than a threshold, the correction unit corrects the original image data using the pixel value of the read image data as the result of reading instead of the pixel value of the original image data.

4. The system according to claim 3, wherein if the difference is not larger than the threshold, the correction unit does not correct the original image data with respect to the image area.

5. The system according to claim 1, wherein the plurality of units further comprises a first processing unit configured to execute, before the comparison, normalization processing for the read image data acquired by the reading unit, and
   wherein the comparison is performed using the read image data having undergone the normalization processing.

6. The system according to claim 1, wherein the plurality of units further comprises a second processing unit configured to execute, before the comparison, optical characteristic correction processing of the reading unit for the read image data acquired by the reading unit, and
   wherein the comparison is performed using the read image data having undergone the optical characteristic correction processing.

7. The system according to claim 6, wherein a correction intensity of the optical characteristic correction processing is higher than a correction intensity of the optical characteristic correction processing performed when the reading unit acquires the read image data.

8. The system according to claim 1, wherein the plurality of units further comprises a third processing unit configured to execute, before the comparison, removal processing of removing the drawing information for the read image data acquired by the reading unit, and
   wherein the comparison is performed using the read image data having undergone the removal processing.

9. The system according to claim 1, wherein the drawing information multiplexed by the multiplexing unit is part of the drawing information of the original image.

10. The system according to claim 1, wherein the image processing system includes an information processing apparatus and an image processing apparatus,
    wherein the information processing apparatus includes the multiplexing unit and the generation unit, and
    wherein the image processing apparatus includes the reading unit, the extraction unit, the acquisition unit, the correction unit, and the saving unit.

11. The system according to claim 1, wherein the image processing system comprises an image processing apparatus capable of executing a printer function and a scanner function.

12. An image processing method executed in an image processing system, the method comprising:
    optically reading a printed material, on which drawing information of an original image is multiplexed, to acquire read image data;
    extracting the drawing information from the acquired read image data;
    acquiring original image data representing the original image based on the extracted drawing information;
    dividing each of the read image data and the original image data into plural image areas;
    comparing the read image data with the original image data for each of the plural image areas;
    determining, for each of the divided plural image areas, which of the read image data or the original image data is used in correcting the original image data;
    correcting the original image data based on a result of the determining;
    saving the corrected original image data as a result of reading the printed material;
    multiplexing the drawing information on the image data of the original image to generate multiplexed image data; and
    generating, based on the multiplexed image data generated by the multiplexing, print image data for printing the printed material.

13. A non-transitory apparatus-readable storage medium storing a program configured to cause an image processing system to carry out a method comprising:
    optically reading a printed material, on which drawing information of an original image is multiplexed, to acquire read image data;
    extracting the drawing information from the acquired read image data;

acquiring original image data representing the original image based on the extracted drawing information;
dividing each of the read image data and the original image data into plural image areas;
comparing the read image data with the original image data for each of the plural image areas;
determining, for each of the divided plural image areas, which of the read image data or the original image data is used in correcting the original image data;
correcting the original image data based on a result of the determining;
saving the corrected original image data as a result of reading the printed material;
multiplexing the drawing information on the image data of the original image to generate multiplexed image data; and
generating, based on the multiplexed image data generated by the multiplexing, print image data for printing the printed material.

* * * * *